US009143344B2

(12) United States Patent
Cho et al.

(10) Patent No.: US 9,143,344 B2
(45) Date of Patent: Sep. 22, 2015

(54) NETWORK SYSTEM INCLUDING AN AIR CONDITIONING APPARATUS AND A METHOD FOR CONTROLLING AN AIR CONDITIONING APPARATUS

(75) Inventors: Sunguk Cho, Changwon (KR); Hoocheol Lee, Changwon (KR); Muhyun Moon, Changwon (KR); Dongbum Hwang, Changwon (KR); Sooyoung Lee, Changwon (KR)

(73) Assignee: LG ELECTRONICS INC., Seoul (KR)

( * ) Notice: Subject to any disclaimer, the term of this patent is extended or adjusted under 35 U.S.C. 154(b) by 515 days.

(21) Appl. No.: 13/298,634

(22) Filed: Nov. 17, 2011

(65) Prior Publication Data
US 2012/0158189 A1 Jun. 21, 2012

(30) Foreign Application Priority Data

Dec. 16, 2010 (KR) .................. 10-2010-0129108

(51) Int. Cl.
| | |
|---|---|
| G05D 3/12 | (2006.01) |
| H04M 3/42 | (2006.01) |
| H04W 72/00 | (2009.01) |
| G06F 3/00 | (2006.01) |
| H04L 12/28 | (2006.01) |
| G06F 21/00 | (2013.01) |
| F24F 11/00 | (2006.01) |

(52) U.S. Cl.
CPC .......... *H04L 12/2829* (2013.01); *F24F 11/006* (2013.01); *F24F 11/0034* (2013.01); *F24F 2011/0063* (2013.01); *F24F 2011/0064* (2013.01)

(58) Field of Classification Search
CPC . F24F 11/006; F24F 11/0086; F24F 11/0012; G05B 15/02; H04L 12/2829
USPC ............... 700/276; 455/414.1, 456.1; 705/51; 715/722
See application file for complete search history.

(56) References Cited

U.S. PATENT DOCUMENTS

| | | | | |
|---|---|---|---|---|
| 5,801,940 | A * | 9/1998 | Russ et al. ........................ 700/9 |
| 6,400,996 | B1 * | 6/2002 | Hoffberg et al. ................ 700/83 |
| 6,640,142 | B1 * | 10/2003 | Wong et al. ..................... 700/28 |
| 6,773,344 | B1 * | 8/2004 | Gabai et al. ...................... 463/1 |
| 7,415,725 | B2 * | 8/2008 | Henneberry et al. ........... 726/17 |
| 7,848,853 | B2 * | 12/2010 | Milder et al. ................. 700/278 |
| 7,917,439 | B2 * | 3/2011 | Barnes, Jr. ...................... 705/51 |
| 8,033,125 | B2 * | 10/2011 | Saruwatari et al. ............. 62/157 |
| 8,332,075 | B2 * | 12/2012 | Harrod et al. ................. 700/278 |
| 8,503,984 | B2 * | 8/2013 | Winbush, III .............. 455/414.1 |
| 8,556,042 | B2 * | 10/2013 | Gerstenkorn et al. ......... 187/388 |
| 8,611,919 | B2 * | 12/2013 | Barnes, Jr. ................. 455/456.1 |

(Continued)

*Primary Examiner* — Robert Fennema
*Assistant Examiner* — Thomas Stevens
(74) *Attorney, Agent, or Firm* — Ked & Associates LLP (57) ABSTRACT

A network system is provided. The network system may include a portable terminal in communication with the Internet, and an air conditioning apparatus that communicates with the portable terminal. The air conditioning apparatus may include a communication module that at least one of communicates with the portable terminal or accesses the portable terminal through the Internet; a user registration device that registers user information of the air conditioning apparatus; a user recognition device that recognizes a user registered in the user registration device; a controller that controls operation of the air conditioning apparatus using operating conditions designated by the registered user; and a driver that drives the air conditioning apparatus using the designated operating conditions.

21 Claims, 10 Drawing Sheets

(56) References Cited

U.S. PATENT DOCUMENTS

| | | | |
|---|---|---|---|
| 2002/0026419 A1* | 2/2002 | Maritzen et al. | 705/41 |
| 2002/0052746 A1* | 5/2002 | Handelman | 704/270 |
| 2004/0133314 A1* | 7/2004 | Ehlers et al. | 700/276 |
| 2004/0193324 A1* | 9/2004 | Hoog et al. | 700/276 |
| 2005/0109048 A1* | 5/2005 | Lee | 62/126 |
| 2006/0111816 A1* | 5/2006 | Spalink et al. | 700/276 |
| 2008/0306632 A1* | 12/2008 | Miki et al. | 700/276 |
| 2009/0140056 A1* | 6/2009 | Leen | 236/49.3 |
| 2010/0125370 A1* | 5/2010 | Baba et al. | 700/276 |
| 2010/0149332 A1* | 6/2010 | Wang | 348/143 |
| 2012/0022700 A1* | 1/2012 | Drees et al. | 700/276 |
| 2012/0209435 A1* | 8/2012 | Harayama | 700/276 |
| 2012/0310418 A1* | 12/2012 | Harrod et al. | 700/276 |

\* cited by examiner

FIG.7

NETWORK SYSTEM INCLUDING AN AIR CONDITIONING APPARATUS AND A METHOD FOR CONTROLLING AN AIR CONDITIONING APPARATUS

CROSS-REFERENCE TO RELATED APPLICATION(S)

The present application claims priority to Korean Patent Application No. 10-2010-0129108, filed on Dec. 16, 2010, which is herein incorporated by reference in its entirety.

BACKGROUND

Field

A network system including an air conditioning apparatus and a method for controlling an air conditioning apparatus are disclosed herein.

BRIEF DESCRIPTION OF THE DRAWINGS

Embodiments will be described in detail with reference to the following drawings in which like reference numerals refer to like elements, and wherein.

DETAILED DESCRIPTION

In the following detailed description, reference is made to the accompanying drawings that form a part hereof, and in which is shown by way of illustration embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the invention is defined only by the appended claims.

Hereinafter, a network system including an air conditioning apparatus and a method for controlling an air conditioning apparatus according to embodiments will be described in detail with reference to the drawings.

Generally, an air conditioning apparatus is an electrical appliance that supplies hot or cold air to an indoor space by operating a refrigerant cycle. Recently, portable terminals, such as a smart phone, through which the Internet may be accessed and through which it is possible to, for example, freely download and execute documents, game programs, and document files, for example, and to talk on the phone have been released.

Further, recently, a home network system capable of controlling operations of electrical equipment, including electrical appliances disposed in the home, using the portable terminal has been provided for new apartments and homes. Thus, it is possible to remotely-control at long range without directly operating various electrical appliances, including an air conditioning apparatus, thereby improving ease of use.

Figure 1:
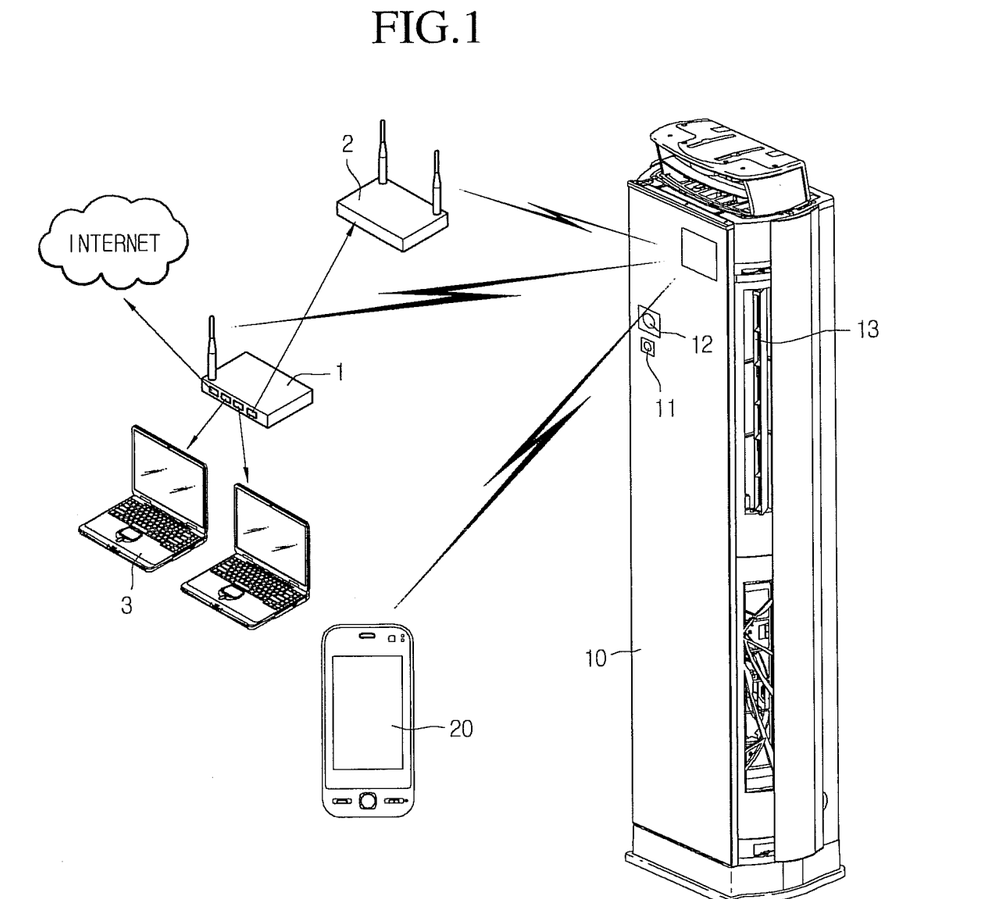
FIG. 1 is a schematic diagram of a network system according to an embodiment.

FIG. 1 is a schematic diagram of a network system according to an embodiment. The network system of FIG. 1 may include an indoor device 10 of an air conditioning apparatus that supplies cold or hot air to an interior of a home or building, for example, a portable terminal 20, which may be, for example, a smart phone, capable of performing wireless communication with the indoor device 10, and a wired/wireless sharer 1 and/or a wireless sharer 2 capable of performing Internet communication between the portable terminal 20 and the indoor device 10. In addition, the network system may further include a computer in a wired or wireless communication connection to the wired/wireless sharer 1.

The portable terminal 20 and the indoor device 10 may each have a built-in communication module for wireless communication. The communication module may include, for example, a Bluetooth module, a Wi-Fi module, or a Zig-Bee module. Further, the indoor device 10 may include an image capturing device 12, such as a camera, that captures an image, such as a face, of a user and a recorder 11 that records a voice of a user. The portable terminal 20 may be also provided with a camera and recorder.

The portable terminal 20 may peer to peer communicate with the indoor device 10 through, for example, a wireless communication module. The user may input operating conditions through a control panel mounted in or on the indoor device 10 or through the portable terminal 20. When inputting operating conditions through the portable terminal 20, the input driving conditions may be transmitted to the indoor device 10 through the communication module. For example, a velocity of an indoor fan and/or an angle of a wind direction controller 13 may be set or changed according to the transmitted driving conditions.

Figure 2:
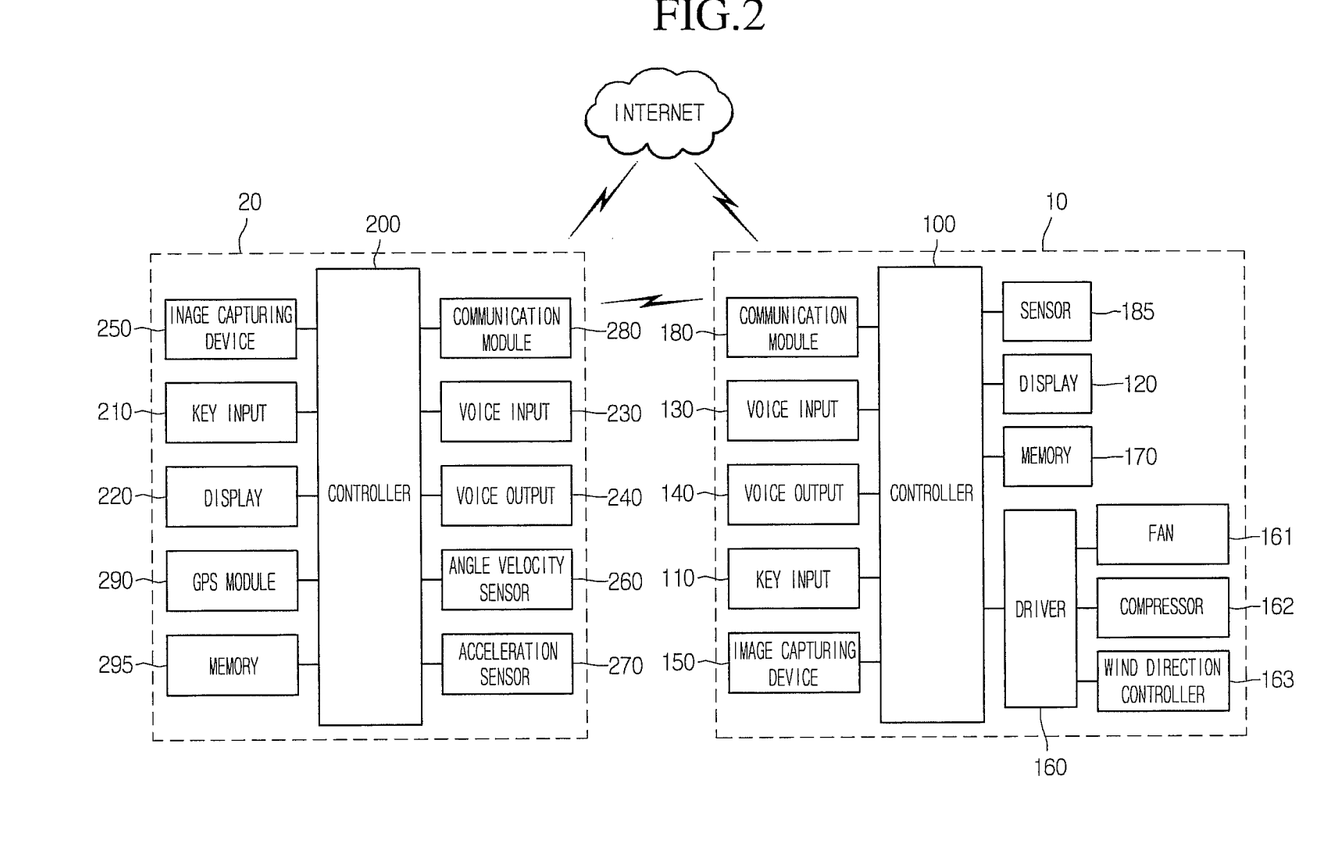
FIG. 2 is a block diagram of a portable terminal and an indoor device capable of wireless communication therebetween in a network system according to an embodiment.

FIG. 2 is a block diagram of a portable terminal and an indoor device capable of wireless communicating therebetween in a network system according to an embodiment. In FIG. 2, the portable terminal 20 of the network system according to an embodiment may be, for example, a smart phone.

The portable terminal 20 may include a controller 200, a key input 210 configured to receive input of a specific command or information, a display 220 that shows conditions of the portable terminal 20 or operating conditions of the indoor device 10, a voice input 230 configured to receive input of the voice of a user, a voice output 240 configured to output the recorded voice, an image capturing device 250 such as a camera, that captures an image, such as the face, of a user, an angular velocity sensor 260 and an acceleration sensor 270 that sense motion of the portable terminal 20, a communication module 280 that wirelessly communicates with the indoor device 10, a GPS module 290 that determines a position of the portable terminal 20, and a memory 295 that stores various information and data.

The key input 210 may include an input button or a touch panel disposed at or on the portable terminal 20. The image capturing device 250 may include a camera mounted in or on the portable terminal 20. The voice input 230 may include a recorder mounted in or on the portable terminal 20, and the voice output 230 may include a speaker mounted in or on the portable terminal 20.

Further, the angular velocity sensor 260 may include a Gyro or Gravity sensor that senses a sloping or rotation angle of the portable terminal 20. Further, the acceleration sensor 270 may sense a velocity or acceleration of the portable terminal 20 as it moves in a straight line in a specific direction.

In addition, as mentioned above, the communication module 280 may include, for example, a Bluetooth module, a Wi-Fi module, or a Zig-Bee module. Further, the display 220 may include, for example, a liquid crystal panel disposed at or on the portable terminal 20.

The indoor device 10 may include a controller 100, a key input 110, a voice input 130, a voice output 140, an image capturing device 150, a display 120, a communication module 180, and a memory 170. The indoor device 10 may further include a driver 160 that drives a fan 161, a compressor 162, and a wind direction controller 163 mounted in the indoor device 10. Further, the driver 160 may include a drive motor controller that controls a current volume supplied to a drive motor that drives the fan 161, the compressor 162, and the wind direction controller 163. The indoor device 10 may also be provided with a sensor 185 at, for example, a front thereof that senses movement or approach of a user.

The image capturing device 150, the voice input 130, the voice output 140, the display 120, and the communication module 180 may be the same configuration as the image capturing device 250, the voice input 230, the voice output 240, the display 220, and the communication module 280 disposed in the portable terminal 20, and therefore, repetitive description thereof has been omitted.

As shown, the portable terminal 20 and the indoor device 10 may independently receive information from the Internet through, respectively, the communication modules 280, 180, and may transmit/receive information therebetween. That is, the portable terminal 20 may download, for example, weather information or product information of the indoor device 10, by accessing the Internet through the communication module 280. Further, the indoor device 10 may download, for example, weather information or product information of the indoor device 10, by accessing the Internet through the communication module 180 and display the same on the display 120. The portable terminal 20 may connect to the Internet through, for example, a Wi-Fi communication serving Access Point, such as the wired/wireless sharer 1 or the wireless sharer 2, as the medium, and transmit/receive information to/from the indoor device 10. This is called Infra-Structure Networking.

Further, the portable terminal 20 and the indoor device 10 may peer to peer communicate using the communication modules 180, 280. For example, if the communication modules 180, 280 are Wi-Fi modules, Wi-Fi-Direct technology, or an Ad-Hoc mode(or network), they may be used to directly communicate without passing through the wireless sharer.

In more detail, Wi-Fi-Direct technology means a technology capable of communicating at a rapid velocity using a communication specification, such as 802.11a,b,g,n, regardless of the installation of a wireless LAN accessing device (AP Access Point). That is, the portable terminal 20 may communicate with the indoor device 10 without passing through a wireless LAN accessing device (Access Point), for example, the wired/wireless sharer or the wireless sharer described above. This technology has recently been used as the communication technology for wireless connection of an indoor device and a portable terminal using Wi-Fi without an Internet network.

Bluetooth communication is already widely used and known as a short-range wireless communication method. It makes wireless communication within a specific range possible between a Bluetooth module built into a portable terminal and a Bluetooth module built into an indoor device.

Hereinafter, a method for controlling an indoor device using a portable terminal according to an embodiment will be described in detail with reference to a flow chart.

Figure 3:
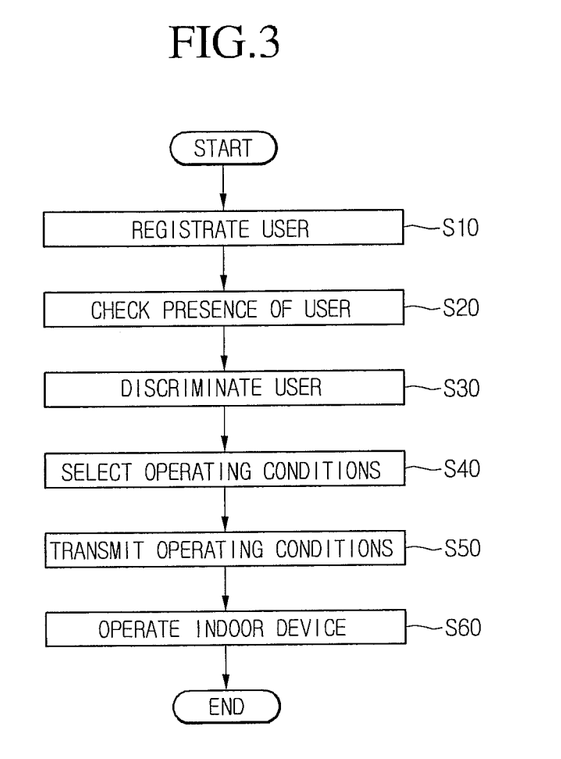
FIG. 3 is a flow chart of a method for driving an indoor device in a network system according to an embodiment.

FIG. 3 is a flow chart of a method for driving an indoor device in a network system according to an embodiment. The method of FIG. 3 may include registering a user of an indoor device, such as the indoor device 10 of FIGS. 1-2, in step S10, determining whether the user is present near the indoor device, step S20, discriminating or identifying who the user is, in step S30, selecting operating or driving conditions according to the discriminated or identified user, in step S40, transmitting the selected operating conditions to the indoor device, in step S50, and starting driving of the indoor device according to the transmitted operating conditions, in step S60.

In more detail, when an indoor device, such as the indoor device 10 of FIGS. 1-2, is installed, the user may perform a user registration process through, for example, a control panel of the indoor device or a portable terminal, such as the portable terminal 20 FIGS. 1-2. That is, the user may register as a user of the indoor device. When the registered user approaches a place in which the indoor device is disposed, the user registration process enables the indoor device to automatically operate according to operating conditions of any one of a designated operation mode operating with the operating conditions input in the registering of the user, a preference operation mode operating with the operating conditions preferred by the registered user, or an individual operation mode operating with the operating conditions directly input by the registered user.

As described above, the method determines or checks whether the user has come into a place in which the indoor device is disposed and identifies who the user is, to automatically operate. That is, the method recognizes whether an individual, who has come into a place in which the indoor device is disposed, is among the registered users. Later, when a controller of the indoor device, such as the controller 100 of FIGS. 1-2, selects the operating conditions for the identified user, the selected operating conditions may include operating conditions corresponding to the designated operation mode input in the user registration process, the preferred operation mode, or operating conditions corresponding to the individual operation mode directly input by, for example, a voice command for the user, and any one of these modes is selected. Further, the selected operating conditions may be transmitted to the indoor device, and the indoor device may be driven according to the transmitted operating conditions.

Hereinafter, a user registration method, a user presence checking or sensing method, a user discrimination or identification method, and an operating conditions selection method will be described in detail with reference to flow charts. The method of transmitting the operating conditions to the indoor device has been described above and therefore, its description has been omitted.

Figure 4:
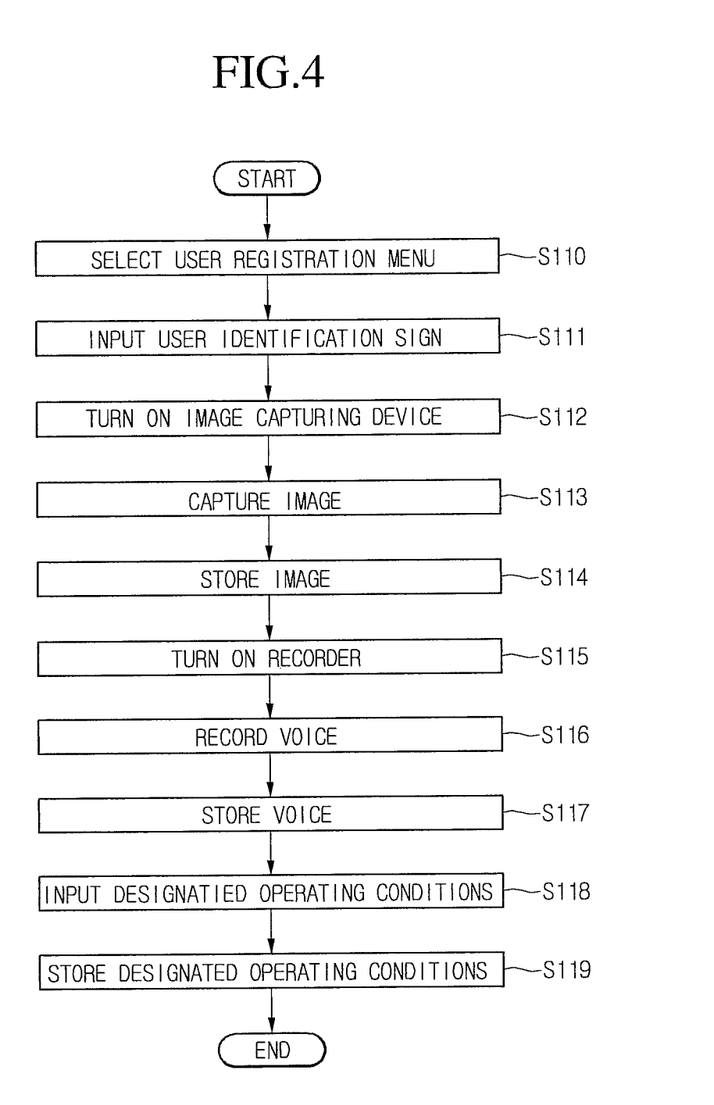
FIG. 4 is a flow chart of a method of registering a user and driving an indoor device according to an embodiment.

FIG. 4 is a flow chart of a method of registering a user and driving an indoor device according to an embodiment. In FIG. 4, the user may perform a user registration using, for example, a control panel disposed at a front of an indoor device, such as the indoor device 10 of FIGS. 1-2. The control panel may include, for example, a button or a touch screen that receives input information, and a display.

In more detail, the user may select a user registration menu through the control panel, in step S110. Further, if the user registration menu is activated, the user may input a user identification sign, in step S111. The user identification sign may be, for example, an Arabic digit number, an English or Korean name of the user, or a character. Various other methods are also available.

If the identification sign of the user is input, an image capturing device, such as a camera, disposed at the front of the indoor device may be turned on, in step S112, and at the same time, may enter a Standby state. Further, if the user presses the touch screen or the button to input a capturing command, an image, for example, a face of the user, may be captured, in step S113. The captured image may be stored in a memory, such as the memory 170 of FIGS. 1-2, connected to a controller, such as controller 100 of the indoor device 10 of FIGS. 1-2, in step S114.

Further, when storing of the image is completed, a recorder disposed at the front of the indoor device may be turned on, in step S115, and a voice recording may be prepared. Further, the user may perform the voice recording, in step S116. When the recording is completed, the user may press a stop button to store the recorded voice information in the memory, in step S117. The user's voice recording may be used to identify the user and may be recorded by, for example, a user reading aloud his or her name or a specific word. When the user later speaks the name or word recorded using this process at the front of the indoor device, the indoor device may recognize it and automatically perform the user identification process to operate the indoor device.

When the voice recording for identifying the user is completed, input of designated operating conditions may be performed, in step S118. The designated operating conditions may be specific operating or driving conditions desired by the registering user, such as an interior temperature, interior humidity, and/or a wind volume of a fan, and may be input via voice. The wind volume of the fan may be input via voice using step by step set wind volumes, such as strong wind, moderate wind, or weak wind. The interior temperature and humidity may be input by, for example, saying 20 degrees and 50%, respectively. Then, the indoor device may record the operating conditions and perform voice interpretation algorithms, and match the operating conditions corresponding to the interpreted voice, to automatically convert the matched driving conditions into electrical signal. The designated operating conditions may also be input through a key input, such as key input 210 or key input 110 of FIGS. 1-2.

When the designated operating conditions are input, the input operating conditions may be stored in the memory, in step S119. The operating conditions information may be stored, for example, as a voice command, as is, or may be converted and stored as an electrical signal.

Figure 5:
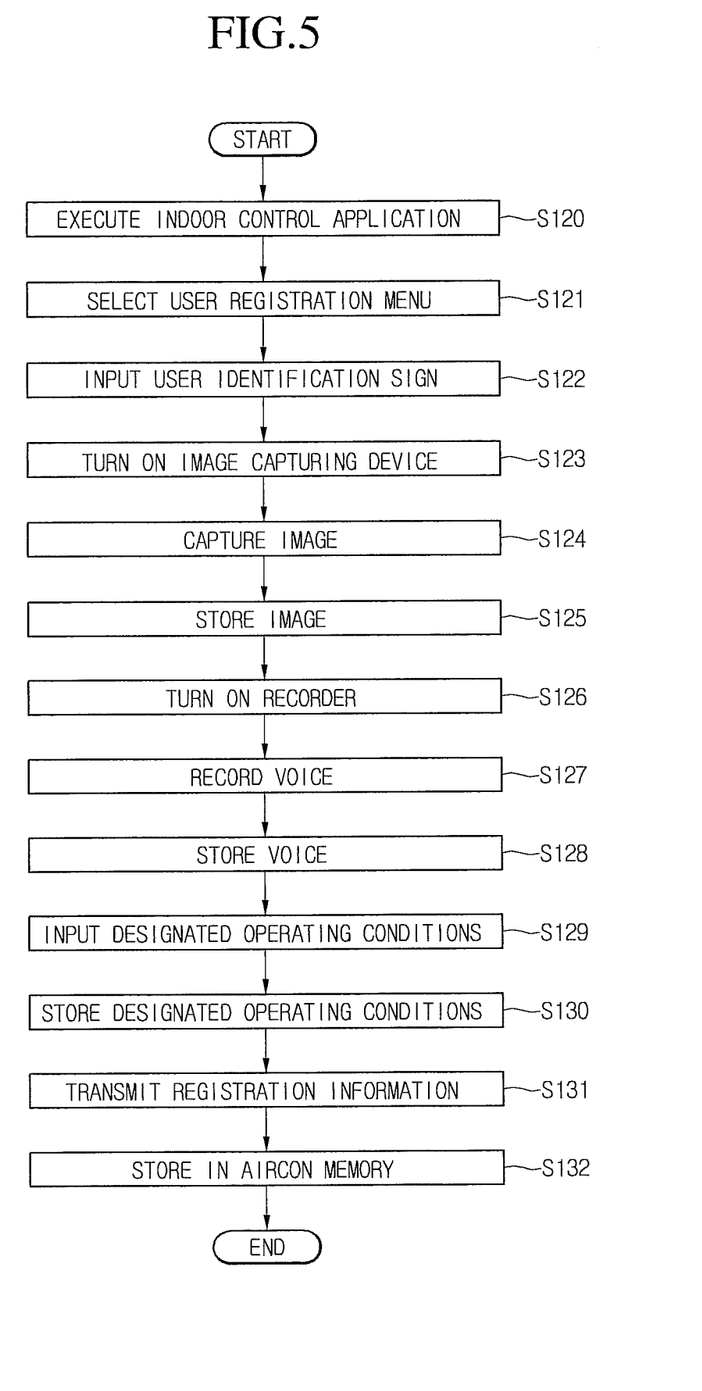
FIG. 5 is a flow chart of a method of registering a user and driving an indoor device according to another embodiment.

FIG. 5 is a flow chart of a method of registering a user and driving an indoor device according to an embodiment. The user registration process of FIG. 5 may be performed in a portable terminal, such as the portable terminal 20 of FIGS. 1-2, and information input by the user registration process may be transmitted to and stored in an indoor device, such as the indoor unit 10 of FIGS. 1-2.

In more detail, to register a user, the user may execute a downloaded indoor device control application in a portable terminal, such as a smart phone, in step S120. Then, when a user registration menu is displayed, the user may select the registration menu by, for example, a touch or button input, in step S121. Further, similar to the embodiment described above, the user identification sign input process for inputting the designated operating conditions and storing the same, steps S122~S130, may be performed on a screen of the portable terminal.

The process may include inputting the user identification sign by a key input including a touch screen or button input, capturing an image, for example, the face, of the user by an image capturing device, such as a camera, recording a voice of the user using an voice input, such as a recorder, and inputting designated operating conditions via voice or key input.

The step S122 of inputting the user identification sign through the step S130 of storing the operating conditions may be the same or similar to those described above with respect to FIG. 4; however, these steps are performed on the screen of the portable terminal, and therefore, repetitive description has been omitted.

When the designated operating conditions are stored, in step S130, the stored user registration information may be transmitted to a controller, such as controller 100 of the indoor device 10 of FIGS. 1-2, in step S131. The transmission method may use wireless transmission using a wireless communication module. Further, the user registration information transmitted to the controller of the indoor device may be stored to the memory of the indoor device, in step S132.

When the user information registration process ends, preparation for operating the indoor device of the air conditioning apparatus is completed. Hereinafter, when the user moves near the indoor device, the method may recognize the user and discriminates or identify the user.

Figure 6:
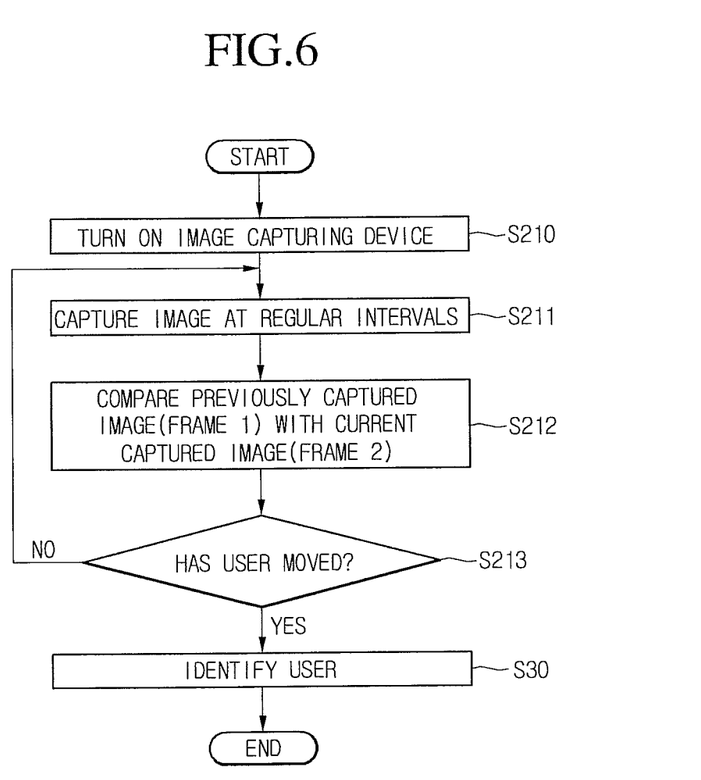
FIG. 6 is a flow chart of a method for sensing a user according to an embodiment.

FIG. 6 is a flow chart of a method for sensing a user according to an embodiment. In FIG. 6, the image capturing device, for example, a camera, mounted in or the front of the indoor device may be turned on, in step S210, and the image capturing device may capture images at regular intervals, in step S211. In addition, a silhouette may be extracted from a previously captured image (frame 1) and a currently captured image (frame 2) by an image difference comparison method to sense any movement in the captured images, in step 212.

In more detail, the image difference comparison method may be a method that obtains image data for a subject, calculates a difference in the obtained image data, and extracts or detects movement of the subject. With this method, a difference between a previously captured image and a currently captured image may be calculated to obtain an image difference frame, excluding a common region, that is, pixels having no image change. Further, the obtained image difference frame may be analyzed to determine whether movement or motion of the subject is present. Since image difference comparison methods are well known to those skilled in the art, description thereof has been omitted. With this embodiment, a number of images captured consecutively with the image capturing device may be compared and analyzed to determine movement of the subject, thereby determining whether a user approaches near the indoor device.

When it is determined that movement of the user is present using the image difference comparison method, in step S213, the method may proceed to the user discrimination or identification process, in step S30, identifying the user. In addition, the image captured by the image capturing device may be used again in the user discrimination or identification method, described in detail below.

Figure 7:
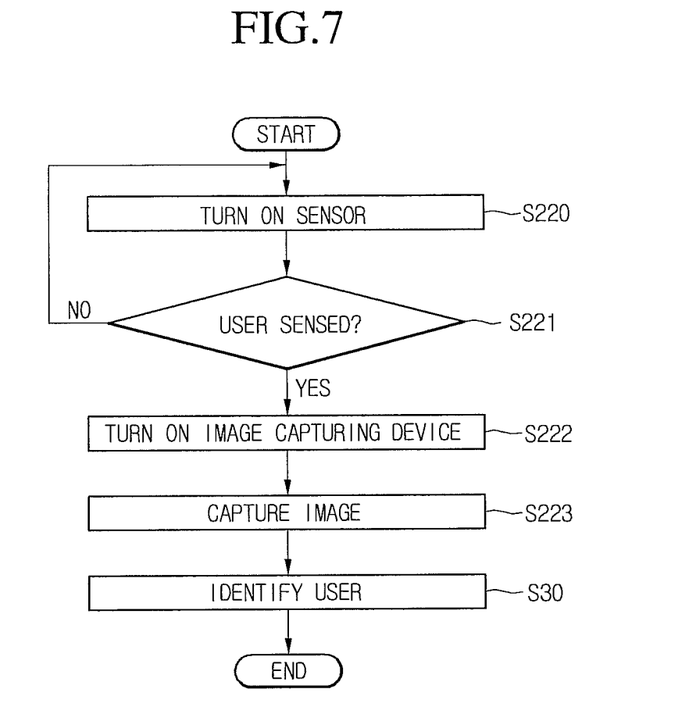
FIG. 7 is a flow chart of a method for sensing a user according to another embodiment.

FIG. 7 is a flow chart of a method for sensing a user according to another embodiment. With this embodiment, a front of an indoor device may be provided with a sensor that senses movement to sense the approach of a user.

In more detail, the sensor may include an infrared ray sensor that senses movement of the user or may include various other sensors. The sensor may be turned on or may be maintained continuously in an on state, in step S220. The sensor may sense the user, in step S221. When sensing the approach of the user, the image capturing device at the front of the indoor device may be turned on, in step S222. Further, the image capturing device may capture an image, for example, a face, of the user, in step S223.

In general, when the user approaches near the indoor device to operate the indoor device, the user's eyes face the indoor device, such that it is not difficult to capture the face of the user. If the face of the user is not exposed to the image capturing device, for example, the face is not exposed to the image capturing device when the user is simply passing by the front of the indoor device, the user discrimination process may not be performed. In other words, when the user is simply passing by the front of the indoor device, the indoor device may not be operated. Thus, it is possible to operate the indoor device only if the face of the user is captured. In order to prevent unnecessary power consumption, when the user intends to drive the indoor device, the user need only expose his or her face as a precondition.

On the other hand, when the face of the user is captured with the image capturing device, the captured image information may be stored in the memory of the indoor device. Then, the method may proceed to the user discrimination or identification process, in step S30.

Figure 8:
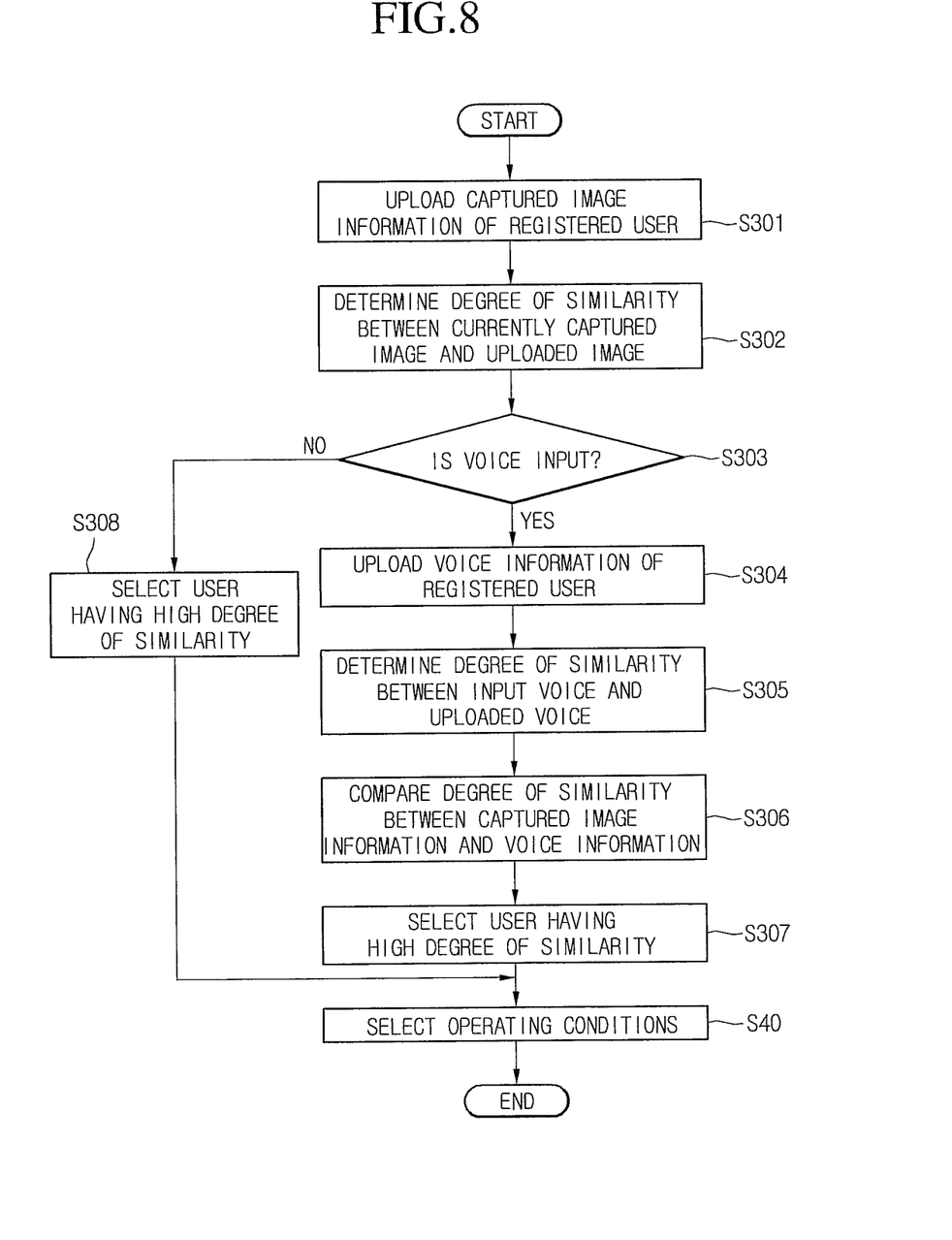
FIG. 8 is a flow chart of a user discrimination or identification method according to an embodiment.

FIG. 8 is a flow chart of a user discrimination or identification method according to an embodiment. In FIG. 8, when the presence of a user or an approach of the user is sensed, thereafter, the method identifies the user.

First, the user captured image information obtained as described with respect to FIG. 6 and FIG. 7 may be uploaded, in step S301. Next, a degree of similarity may be determined by comparing and analyzing the captured image information obtained as described with respect to FIG. 6 and FIG. 7 and the captured image information obtained in the user registration process, in step S302. The degree of similarity may be calculated numerically between the images of the user obtained in the user registration process and obtained as described with respect to FIG. 6 and FIG. 7.

Further, when the degree of similarity for the images is determined, it is determined whether a voice input of the user is present, in step S303. The voice input may be, for example, a voice command for the operating conditions of the indoor device, or a voice command for preparing operation of the indoor device.

On the other hand, if it is determined that a voice command of the user has not been input, then only the degree of similarity confirms who the user is in the controller of the indoor device. That is, a registered user having a highest degree of similarity value for the degree of similarity obtained in the degree of similarity determination process may be selected, and it may be determined that the selected registered user approaches near the indoor device. Further, the operating conditions selection process suitable for the selected registered user may be performed, in step S40.

Whereas, when a voice command of the user is input, all voice information obtained for the user in the user registration process may be uploaded, in step S304. Further, the degree of similarity for the voice may be determined by comparing the input voice and the voice of the user obtained in the user registration process, in step S305. Further, a user having a highest degree of similarity for the information may be selected, in step S307, by comparing values for the degree of similarity of the captured image information and the voice information, in step S306. Furthermore, the operating conditions selection process, in step S40, to select operating conditions suitable for the selected user may be performed.

In more detail, the highest values of values of the degree of similarity for voice information and for captured image information may be calculated, respectively, and a registered user having a further highest values of values of the degree of similarity may be selected. For example, if a man called A is a registered user and has the highest value of the degree of similarity for the voice information, and a man called B is a registered user and has the highest value of the degree of similarity for the captured image information, the degree of similarity for voice information may be higher than the degree of similarity for the captured image information. It is then determined that man approaching near the indoor device is A by the controller of the indoor device.

Figure 9:
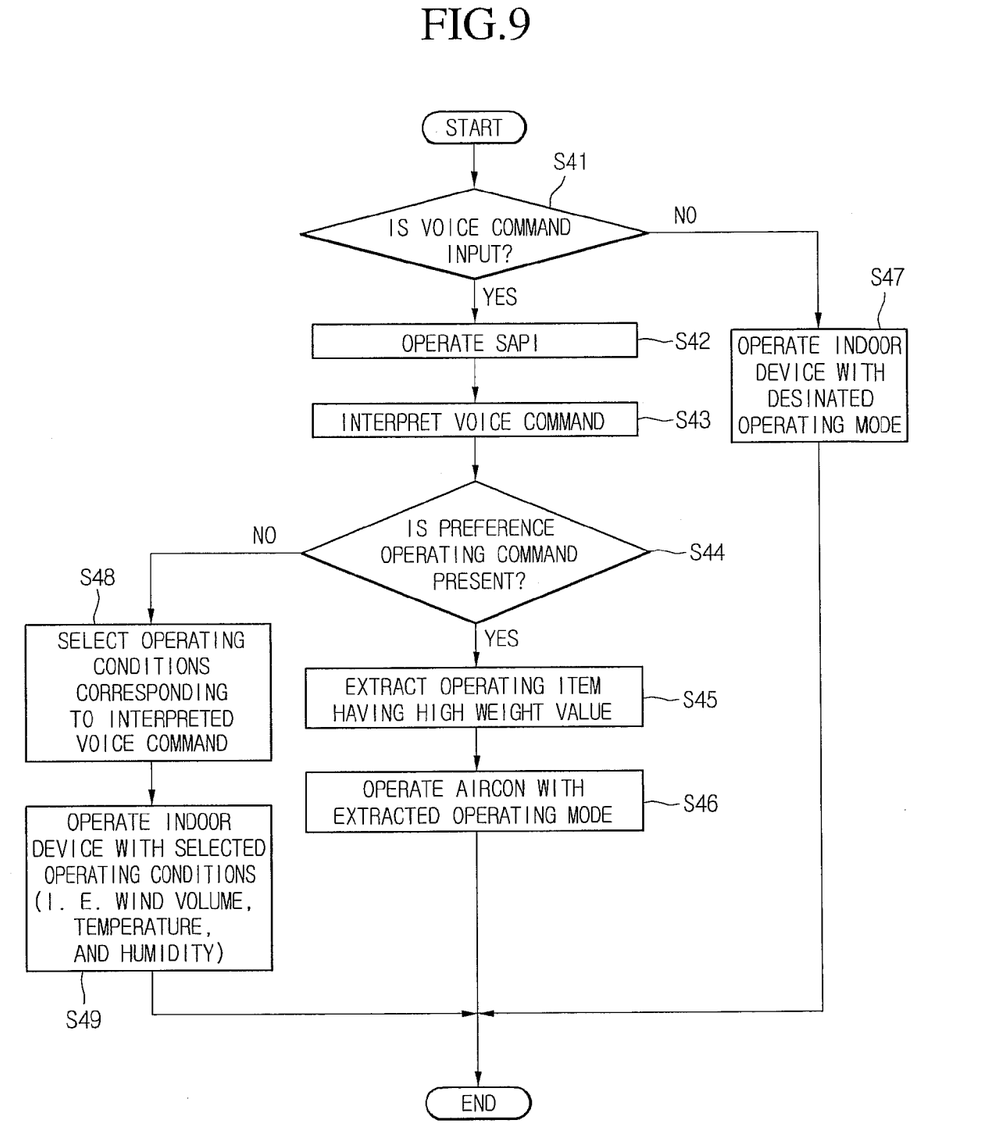
FIG. 9 is a flow chart of an operating conditions selection method according to an embodiment.

FIG. 9 is a flow chart of an operating conditions selection process according to an embodiment. In more detail, when the process of FIG. 8 identifies the user, the process selects operating conditions suitable for the identified user. That is, the process may select one of an operating mode that operates using operating conditions according to an interior temperature, an interior humidity, and a wind direction directly input by the user, operating using a designated operating mode stored in the user registration process when a separate operating mode is not input, or a preference operating mode preferred by the user.

When the user identification process ends, it may be sensed whether operating conditions of the indoor device has been input via voice, in step S41. When it is determined that a voice command inputting the operating conditions has not been separately input, the indoor device may be operated by the designated operating mode input in the user registration process, in step S47.

Whereas, when it is sensed that a voice command of the user has been input, a Voice Application Programming Interface (SAPI) may be operated to analyze the input voice command, in step S42. Further, the process may interpret the analyzed voice command, in step S44.

That is, the process may determine whether the interpretation result is operating conditions (for example, temperature, humidity, wind velocity, and wind direction) of the indoor device directly input by the user, or a command to execute a preference operating mode, in step S44. If it is determined that the user directly input a numerical value for the interior temperature, interior humidity, and wind volume, the operating conditions corresponding to the analyzed voice command may be selected, in step S48. The indoor device may be operated according to the selected operating conditions, in step S49.

Whereas, when it is interpreted that the preference operating mode command is input by the user, an operating item having a high weight value among the operating conditions input by the user may be extracted, in step S45, and the indoor device may be operated according to the extracted operating mode, in step S46. The method forming the preference operating mode will be described in detail below.

Figure 10:
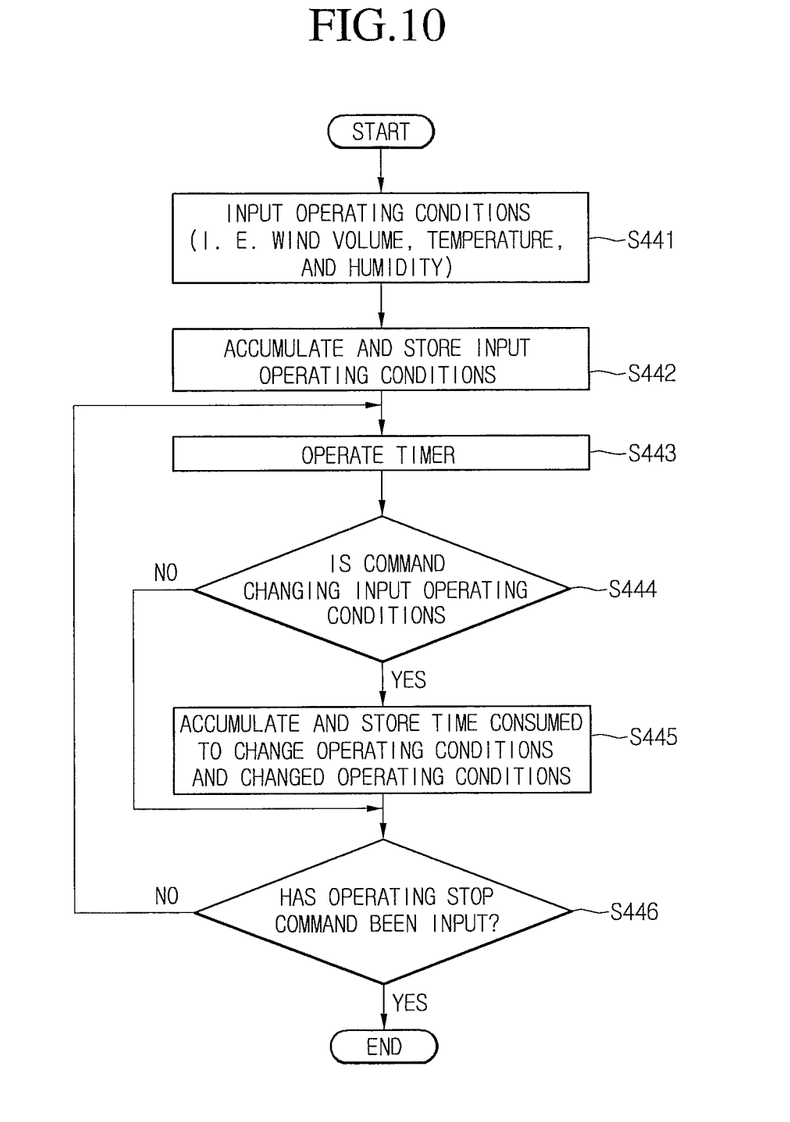
FIG. 10 is a flow chart of a preference operating mode setting method according to an embodiment.

FIG. 10 is a flow chart of a preference operating mode setting method according to an embodiment. In FIG. 10, the preference operating mode may receive and store the operating conditions input by the user to set the operating conditions having a largest frequency as the preference operating mode.

In more detail, the operating conditions may be input by a user, in step S441. The operating conditions may include an interior temperature, an interior humidity, and a wind volume. Further, the operating conditions may be mechanically input via a control panel, may be input via the portable terminal, and/or may be input in voice.

The input operating conditions may be received and stored in the memory, in step S442. Further, from the moment operation of the indoor device is started using the input operating conditions, a timer may operate, in step S443. The timer may measure the time consumed to change the operating conditions from the initial operating conditions. The measured time may be used as a determination factor for the preference operating conditions, by identifying whether the user changes the operating conditions after a certain amount of time has lapsed from the initial operating conditions.

During this process in which the timer operates to count time, the controller of the indoor device may sense whether an operating conditions command change is input by the user, in step S444. When the command changing the operation conditions is not input, the air conditioning apparatus is continuously operated using the initial operating conditions, and simultaneously, the timer continuously counts time.

On the other hand, when a command changing the operating conditions is input, the time consumed to change the operating conditions and the changed operating conditions may be received and stored. Simultaneously, operation of the timer may be stopped to re-initialize, in step S445. In addition, when the operating stop command is not input, in step S446, the timer may count time again and the process may determine whether the command changing the operating conditions is input again. Further, when the operating stop command is input, operation of the indoor device may be ended.

A weight value may be given for operating conditions having a largest selection frequency of the accumulated operating conditions. Further, when the user selects the preference operating mode, the operating conditions having the largest weight value may be selected as the preference operating mode, and the indoor device may be controlled to be driven using the selected operating mode.

The control method for an air conditioning apparatus as discussed above may have at least the following advantages.

First, if a user approaches a location, in which the indoor device is disposed, by storing user information and operating conditions using the indoor device of the air conditioning apparatus, the indoor device may be automatically operated using selected operating conditions, thereby not necessitating operating separately.

Second, it is possible to automatically operate the indoor device to perform the operating conditions of the indoor device as the designated operating conditions without a remote controller or special input device, such that a situation in which the indoor device is not operated does not occur due to loss of the remote controller.

Third, whenever the user inputs the operating conditions of the indoor device, the operating conditions may be received and stored to automatically select a preference operating mode or operating conditions for each user, thereby providing a pleasant indoor environment for each user operating the indoor device.

Embodiments disclosed herein provide a control method for an air conditioning apparatus that enables an indoor device of the air conditioning apparatus to be remotely controlled using a smart phone or a control panel disposed in the air conditioning apparatus.

Further, embodiments disclosed herein provide a network system that may include a portable terminal capable of downloading a program through the Internet; and an air conditioning apparatus that communicate with the portable terminal. The air conditioning apparatus may include a communication module that communicates with the portable terminal or that accesses the portable terminal through the Internet; a user registration portion that registers user information of the air conditioning apparatus; a user recognition portion that recognizes the user registered in the user registration portion; a controller that controls operations of the air conditioning apparatus using an operating mode determined by the registered user; and a driver that drives using the determined operating mode.

Further, embodiments disclosed herein provide a control method for an air conditioning apparatus that may include registering a user of the air conditioning apparatus; checking for a presence of the user approaching near the air conditioning apparatus; identifying the approaching user; selecting an operating condition suitable for the identified user; and driving the air conditioning apparatus using the selected operating mode.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioning apparatus in communication with a portable terminal being linkable with the Internet, the air conditioning apparatus comprising:
   a communication module that at least one of communicates with the portable terminal or accesses the portable terminal through the Internet;
   a user registration device that registers user information of the air conditioning apparatus, the user registration device having a first input device to input initial operating conditions including at least one of an interior temperature, an interior humidity, or a wind volume of a fan;
   a user recognition device that recognizes a user registered in the user registration device;
   a timer configured to measure time elapsed to change operating conditions from the initial operating conditions;
   a controller that senses whether command has been input to change the operating conditions; and
   a driver that drives the air conditioning apparatus by the controller, wherein the air conditioning apparatus is operated with the initial operating conditions and the timer continuously counts time when the command changing the operating conditions has not been input, wherein the time elapsed to change the operating conditions and the changed operating conditions are stored when the command changing the operating conditions has been input, wherein the controller determines a preference operating mode using preference operating conditions based on the stored time and the changed operating conditions, wherein a weight value is given to the operating conditions having a largest selection frequency of accumulated operating conditions, wherein the controller determines that the operating conditions having a largest weight value is selected as a preference operating mode, and wherein when the user selects the preference operating mode, the controller controls the driver such that the driver drives the air conditioning apparatus using the selected preference operating mode.

2. The air conditioning apparatus according to claim 1, wherein the portable terminal comprises:
   a controller;
   a communication module that at least one of communicates with the air conditioning apparatus or accesses the Internet; and
   a user registration device that registers the user information of the air conditioning apparatus.

3. The air conditioning apparatus according to claim 2, wherein the communication module includes any one of a Wi-Fi module, a Bluetooth module, and a mesh network module.

4. The air conditioning apparatus according to claim 2, wherein the user registration device of the portable terminal comprises:
   a key input configured to receive input of a user identification sign or the operating conditions;
   a voice, input configured to record a voice of the user; and
   an image capturing device configured to capture an image of the user.

5. The air conditioning apparatus according to claim 4, wherein the captured image comprises a photograph of a face of the user.

6. The air conditioning apparatus according to claim 4, wherein the user recognition device of the portable terminal includes at least one of the voice input or the image capturing device.

7. The air conditioning apparatus according to claim 1, wherein the user registration device of the air conditioning apparatus comprises:
   a key input configured to receive input of at least one of a user identification sign or the operating conditions;
   a voice input configured to record a voice of the user; and
   an image capturing device configured to capture an image of the user.

8. The air conditioning apparatus according to claim 7, wherein the captured image comprises a photograph of a face of the user.

9. The air conditioning apparatus according to claim 7, wherein the user recognition device includes at least one of the voice input or the image capturing device.

10. The air conditioning apparatus according to claim 1, wherein the user recognition device includes a sensor mounted on the air conditioning apparatus that senses movement of the user.

11. The air conditioning apparatus according to claim 1, wherein the portable terminal is configured to download a program through the Internet.

12. The air conditioning apparatus according to claim 1, wherein the portable terminal comprises a mobile phone.

13. A method for controlling an air conditioning apparatus, the method comprising:
   registering a user of the air conditioning apparatus, the registering comprising inputting initial operating conditions including at least one of an interior temperature, an interior humidity, or a wind volume of a fan;
   determining whether a command has been input to change the operating conditions;
   storing time elapsed to change the operating conditions and the changed operating conditions are stored when the command changing the operating conditions has been input;
   determining a preference operating mode using preference operating conditions based on the stored elapsed time and the changed operating conditions;
   checking for the presence of a user approaching near the air conditioning apparatus;
   identifying the approaching user;
   selecting the operating mode suitable for the identified user; and
   driving the air conditioning apparatus using the selected preference operating mode, wherein the preference operating mode is determined based on the time elapsed to change the operating conditions from the initial operating conditions of the air conditioning apparatus, wherein an individual operating mode is determined based on driving conditions input by the registered user, wherein a weight value is given to the operating conditions having a largest selection frequency of accumulated operating conditions, wherein the operating conditions having a largest weight value is selected as the preference operating mode, and wherein when the user selects the preference operating mode, the air conditioning, apparatus is driven using the selected preference operating mode.

14. The method for controlling an air conditioning apparatus according to claim 13, wherein the registering the user is performed through a control panel disposed in or on the air conditioning apparatus or a portable terminal in communication with the Internet.

15. The method for controlling an air conditioning apparatus according to claim 14, wherein the registering the user comprises:
   selecting a user registration menu:
   inputting a user identification sign on the user registration menu to register the user; and
   obtaining and storing at least one of a voice or an image of the registered the user.

16. The method for controlling an air conditioning apparatus according to claim 14, wherein the registering the user is performed through the control panel of the air conditioning apparatus or a control application for the air conditioning apparatus installed in the portable terminal, wherein user information registered through the control panel of the air conditioning apparatus is stored in the air conditioning apparatus, and wherein the user information registered through the control application is wirelessly transmitted to the controller of the air conditioning apparatus and stored in the air conditioning apparatus.

17. The method for controlling an air conditioning apparatus according to claim 16, wherein the wireless transmission of information between the portable terminal and the air conditioning apparatus is performed by any one of Wi-Fi communication, Bluetooth communication, and mesh network communication.

18. The method for controlling an air conditioning apparatus according to claim 13, wherein the checking for the presence of the user approaching near the air conditioning apparatus comprises:
- sensing movement of the user using a sensor disposed on or in the air conditioning apparatus; and
- capturing an image of the sensed user using an image capturing device disposed on or in the air conditioning apparatus.

19. The method for controlling an air conditioning apparatus according to claim 13, wherein the checking for the presence of the user approaching near the air conditioning apparatus comprises:
- capturing a series of images at a front of the air conditioning apparatus using the image capturing device disposed on or in the air conditioning apparatus; and
- determining whether the user approaches or movement of the user, by comparing the captured images using an image difference comparison method.

20. The method for controlling an air conditioning apparatus according to claim 13, wherein the operating conditions comprise operating conditions for a fan, a compressor, and a wind direction controller.

21. The method for controlling an air conditioning apparatus according to claim 13, wherein the operating conditions comprise operating conditions for a desired wind volume, temperature, and humidity.

* * * * *